United States Patent
Petit et al.

(10) Patent No.: US 9,090,413 B2
(45) Date of Patent: Jul. 28, 2015

(54) POTENTIAL FLUIDIZATION DEVICE FOR CONVEYING POWDER MATERIALS IN A HYPERDENSE BED

(75) Inventors: Geoffrey Petit, Peynier (FR); Mehrdji Hemati, Pins Justaret (FR); Jean-Marc Rousseaux, Aix en Provence (FR)

(73) Assignee: Rio Tinto Alcan International Limited, Montreal, Quebec (CA)

(*) Notice: Subject to any disclaimer, the term of this patent is extended or adjusted under 35 U.S.C. 154(b) by 369 days.

(21) Appl. No.: 13/508,817

(22) PCT Filed: Oct. 19, 2010

(86) PCT No.: PCT/FR2010/000692
§ 371 (c)(1),
(2), (4) Date: May 9, 2012

(87) PCT Pub. No.: WO2011/055026
PCT Pub. Date: May 12, 2011

(65) Prior Publication Data
US 2012/0230778 A1 Sep. 13, 2012

(30) Foreign Application Priority Data
Nov. 9, 2009 (FR) ...................................... 09 05372

(51) Int. Cl.
*B65G 53/18* (2006.01)
*B65G 53/20* (2006.01)
(Continued)

(52) U.S. Cl.
CPC .............. *B65G 53/20* (2013.01); *B65G 53/16* (2013.01); *C25C 3/14* (2013.01)

(58) Field of Classification Search
USPC ......................................................... 406/89
See application file for complete search history.

(56) References Cited

U.S. PATENT DOCUMENTS 3,024,071 A * 3/1962 Morrow ........................ 406/89
3,056,632 A * 10/1962 Isler ............................. 406/89
(Continued)

FOREIGN PATENT DOCUMENTS

DE 1094661 B 12/1960
DE 1150320 B 6/1963
(Continued)

OTHER PUBLICATIONS

Kazakhstan Office Action (with English translation) dated Aug. 7, 2013, for KZ application No. 2012/1567.1.
(Continued)

*Primary Examiner* — Joseph Dillon, Jr.
(74) *Attorney, Agent, or Firm* — Banner & Witcoff, Ltd.

(57) ABSTRACT

Device for transporting powder comprising a conveyer, which includes a lower channel in which a gas circulates, and an upper channel, designed for the circulation of powder and said gas, said lower channel and said upper channel being separated by a porous wall that said gas can pass through, the lower channel being supplied with gas at a pressure allowing the potential fluidization of said powder in said upper channel, said upper channel being provided in its upper part with transverse walls placed so that they delimit with the upper wall of said upper channel at least one upper zone in which a gas bubble under pressure is formed as a result of putting said air chute under potential fluidization pressure. At the level of at least one bubble so formed, the wall of the upper channel includes a means of removal for fluidization gas provided with a means of creating pressure drop, which creates a substantially constant pressure drop.

21 Claims, 3 Drawing Sheets

(51) Int. Cl.
*B65G 53/16* (2006.01)
*C25C 3/14* (2006.01)

(56) References Cited

U.S. PATENT DOCUMENTS

| | | | |
|---|---|---|---|
| 3,268,264 A * | 8/1966 | Squires | 406/89 |
| 3,870,374 A * | 3/1975 | Wentzel et al. | 406/89 |
| 4,016,053 A | 4/1977 | Stankovich et al. | |
| 4,299,683 A * | 11/1981 | Adorno et al. | 204/246 |
| 4,450,053 A * | 5/1984 | Merz et al. | 205/392 |
| 4,515,503 A * | 5/1985 | Snowdon | 406/11 |
| 4,659,263 A * | 4/1987 | Hanrot et al. | 406/89 |
| 4,692,068 A * | 9/1987 | Hanrot et al. | 406/89 |
| 4,747,732 A | 5/1988 | Hanrot et al. | |
| 4,909,676 A * | 3/1990 | Heep et al. | 406/14 |
| 4,930,691 A * | 6/1990 | Nagell | 222/630 |
| 4,946,044 A * | 8/1990 | Havrilla | 209/474 |
| 5,299,694 A * | 4/1994 | Rambaud | 209/135 |
| 5,360,297 A * | 11/1994 | Enstad et al. | 406/89 |
| 5,669,509 A * | 9/1997 | Sherman | 209/2 |
| 5,975,309 A * | 11/1999 | Mitsuda et al. | 209/474 |
| 6,382,881 B1 | 5/2002 | Gasquet et al. | |
| 6,402,437 B1 * | 6/2002 | Gasquet et al. | 406/198 |
| 6,508,611 B2 * | 1/2003 | Eckel et al. | 406/41 |
| 6,719,500 B2 * | 4/2004 | Pfeiffer et al. | 406/91 |
| 6,749,373 B2 * | 6/2004 | Von Geldern et al. | 406/23 |
| 7,048,475 B2 * | 5/2006 | Cloue et al. | 406/155 |
| 7,144,204 B2 * | 12/2006 | Hilgraf | 406/95 |
| 7,191,807 B2 * | 3/2007 | DeMaison et al. | 141/83 |
| 7,407,345 B2 * | 8/2008 | Karlsen et al. | 406/156 |
| 8,425,159 B2 * | 4/2013 | Roumieu et al. | 406/89 |
| 8,602,693 B2 * | 12/2013 | Bligh et al. | 406/197 |
| 8,764,350 B2 * | 7/2014 | Bjarno | 406/197 |
| 2010/0189518 A1 | 7/2010 | Roumieu et al. | |

FOREIGN PATENT DOCUMENTS

| | | |
|---|---|---|
| EP | 0179055 B1 | 3/1988 |
| EP | 1086035 B1 | 9/2002 |
| KZ | 9248 | 1/1998 |
| RU | 1543790 | 7/1995 |
| WO | 2009010667 A2 | 1/2009 |

OTHER PUBLICATIONS

International Search Report mailed Dec. 28, 2010 (PCT/FR2010/000692); ISA/EP.

* cited by examiner

POTENTIAL FLUIDIZATION DEVICE FOR CONVEYING POWDER MATERIALS IN A HYPERDENSE BED

The present application is a U.S. National Phase filing of International Application No. PCT/FR2010/000692, filed on Oct. 19, 2010, designating the United States of America and claiming priority to France Patent Application No. 0905372, filed Nov. 9, 2009. The present application claims priority to and the benefit of all the above-identified applications, and all the above-identified applications are incorporated by reference herein in their entireties.

The invention relates to a closed potential fluidization device for horizontal or inclined conveyance of materials having the characteristics of fluidizable powders, from a storage area to at least one zone to be supplied, distant from each other, typically by a few hundred meters.

The invention relates in particular to a closed potential fluidization device for transporting and supplying "reserve-capacities" with product in powder form, like alumina for example, to give an uninterrupted supply, from a single storage zone of said powder material, a conditioning unit such as a bag-filling machine, or a production unit such as an extrusion machine or a series of igneous electrolysis tanks.

The term "fluidizable materials" is intended to include all materials well-known to the expert in the field that are in powder form, the grains having a cohesion and a particle size such that the throughput velocity of the air blown in through the powder mass leads, at low velocity, to decohesion of the particles between each other and a reduction in internal friction forces. Such materials are, for example, alumina to be used for igneous electrolysis, cements, plasters, quick or slaked lime, fly-ash, coal dust, crystals of salts such as calcium fluoride, sodium sulfate, phosphates, etc., plastic aggregates, foodstuffs such as dried milk, flour, etc.

The invention also relates to a device designed for the transportation of powders over long distances, typically greater than one kilometer.

The powder transport device developed by the applicant and described in European patent EP 0 179 055 allows continuous supply of solid powders in a hyperdense phase. It is in particular used to supply alumina, systematically and continuously, to distribution and storage hoppers located in the superstructure of electrolysis tanks. It is a potential fluidization device. As in conventional fluidization, this device includes, between the storage zone and the zone to be supplied, at least one horizontal conveyer, called an air chute, made up of a lower channel designed for the circulation of a gas, and a higher channel designed for the circulation of powder and gas, the two channels being separated by a porous wall, through which said gas can pass. The lower channel is supplied with gas by at least one feed pipe. In contrast to what happens in conventional fluidization, the powder completely fills the higher channel of the conveyer and this conveyer is provided with at least one balancing column partially filled with powder, the filing height of the solid/gas suspension balancing the gas pressure. This balancing column makes it possible to create conditions of potential fluidization for the powder. The latter, scarcely agitated because of the very low gas flow rate, appears in the air chute in the form of a hyperdense bed.

In order to properly understand potential fluidization, it is useful to recall what conventional fluidization is, usually practiced for conveying powder, and described for example in U.S. Pat. No. 4,016,053. The device used in fluidization also comprises an air chute, such as that described previously. The fluidization gas is introduced at a given pressure $p_f$ into the lower channel, passes through said porous wall, then passes between the powder particles at rest forming the layer to be fluidized. Unlike the potential fluidization device described in EP 0 179 055, the thickness of this layer at rest is much lower than the height of the upper channel of said conveyer, i.e. in the absence of any fluidization gas injection, the powder fills the upper channel of the horizontal conveyer only very partially. By imposing a high gas flow rate, said particles are set in motion and are raised, each one losing the permanent contact points with its neighbors. By this means, the interstitial space between the particles increases, internal frictions between particles are reduced and these particles are put into a dynamic state of suspension. From this, there results an increase in the initial volume of powder and, correlatively, a reduction in the apparent density, since a suspension of a solid phase in a gas phase is formed.

The apparent density of the material is therefore lower in comparison to that encountered in potential fluidization, such as that described in EP 0 179 055, where reference is made to a hyperdense phase. The term "dense phase" is generally reserved for pneumatic transport at high pressure. The hyperdense phase is characteristic of potential fluidization. To give a clear idea, it is considered, for example in the case of alumina $Al_2O_3$ that the solid/gas ratio is about 10 to 150 kg $Al_2O_3$/kg air in dense phase pneumatic transport and from 750 to 950 kg $Al_2O_3$/kg air for transport by hyperdense phase potential fluidization. The hyperdense phase therefore makes it possible to transport the powder solid at very high solid/gas concentrations, clearly higher than the dense phase in pneumatic transport.

In the case of potential fluidization, even when there is no gas injection, the powder fills the upper channel almost completely. When the gas is introduced into the lower channel, the balancing column partially fills with the powder occupying the upper channel, up to a total head which balances pressure pf and prohibits any increase in the interstices between particles.

So the presence of a balancing column prohibits the fluidization of powder present in the horizontal conveyer and causes said material to take on the appearance of a hyperdense potential fluidization bed. In addition, as the interstitial distance between the particles does not increase, the permeability of the medium to the gas introduced at pressure pf is very low and restricts gas flow to a very small level. This low gas flow passing through the balancing column is called "degassing". For example, the velocity of the circulating gas corresponding to a fluidization pressure $p_f$ of 80 millibar and causing the alumina in powder form to fluidize is about 33. $10^{-3}$ $m \cdot s^{-1}$ in the device described in U.S. Pat. No. 4,016,053, whereas, in the potential fluidization device in EP 0 179 055, the velocity of circulating gas is only about 4. $10^{-3}$ $m \cdot s^{-1}$. This velocity is too low to be able to cause the fluidization of alumina throughout the conveyer.

There is no fluidization but it is appropriate to refer to potential fluidization: while there is no permanent circulation of material in the air chute, there is flow by successive crumbling as soon as the need for powder arises, for example when the level of the zone to be supplied drops below a critical value. When the continuous consumption of material stored in the zone to be supplied is such that the level of material drops below the opening of the supply chute, a certain quantity of powder escapes from the chute, creating a "vacuum" which is filled by the crumbling material; this crumbling entrains another upstream and is therefore reproduced gradually in the air chute moving up towards the storage bin.

The device for conveyance on a potential fluidization hyperdense bed, as described in EP 0 179 055, is used on a large scale, in particular to supply the tanks of recent plants for producing aluminum by igneous electrolysis. Patent EP-B-1 086 035 describes an improvement to the previous device in which the upper part of the upper channel of the air chute is provided in certain places with barriers, for example in the form of flat iron parts perpendicular to the wall of said upper part, which help to create and durably maintain, in the upper part of the upper channel of the air chute, adjacent gas bubbles within each of which prevails a bubble pressure when said air chute is supplied with fluidization gas at potential fluidization pressure. The applicant had indeed noted that the creation of gas bubbles under pressure made it possible to make the operation of the air chute more stable.

In international patent application WO2009/010667, the applicant specifies the optimal conditions under which such a device can be used with a minimum of risk of powder segregating during transportation.

Mindful of the major success encountered by this type of device, in particular its almost systematic employment in the majority of recent aluminum electrolysis plants, the applicant sought to improve the solution provided by hyperdense phase conveying still further. In particular, the applicant undertook tests designed to test the limits of the system, in order to better determine what parameters are important, both to make the conditions of use of such air chutes less stringent, and to simplify their design and their manufacture.

A first subject of the invention is a device for transporting a powder, between a supply zone, typically a storage zone for said powder, and at least one zone to be supplied, including a conveyer, called an "air chute", which includes a lower channel designed for the circulation of a gas and an upper channel designed for the circulation of powder and said gas, said lower channel and said upper channel being separated by a porous wall that said gas can pass through, the lower channel being connected to a gas feed pipe that can supply said lower channel with gas at a pressure such as allows potential fluidization of said powder in said upper channel, a pressure which will subsequently be referred to as "potential fluidization pressure" or, more simply, "fluidization pressure", the upper channel being provided in its upper part with transverse walls forming an obstacle to the circulation of said gas and said powder, said walls being laid out so that they form with the upper wall of said upper channel at least one space in which a gas bubble under pressure forms, resulting from putting said air chute under potential fluidization pressure, the pressure prevailing in said bubble being called "bubble pressure", said device being characterized in that, at the level of at least one bubble, and preferably at the level of each bubble, the wall of the upper channel is provided with a means of removing the fluidization gas connecting said bubble to an external environment, typically ambient air or a device designed for treating the gases collected above the electrolysis cells (gas treatment center or "CTG"), and including a means for creating pressure drop, which creates a substantially constant pressure drop, or pressure loss. This pressure drop is set at a value such that, if the gas is removed to an external environment where the pressure is substantially constant (ambient air at atmospheric pressure for example), said bubble pressure is itself maintained at a substantially constant value, ranging between the fluidization pressure and the pressure of said external medium.

The applicant undertook laboratory tests to test the operating limits of the system described in EP 1 086 035. In particular, certain tests had been carried out to better determine the phenomena occurring in the balancing column. One of the side walls of the air chute, represented by a fluidization column topped with a balancing column, was transparent, which made it possible to observe the behavior of powder in the upper channel and the balancing column. It was therefore possible to note that the turbulent mode in the balancing column made the higher level of powder present in the balancing column particularly fluctuating and that this disturbed the bed in the air chute, in the vicinity of said balancing column. An escape valve had additionally been placed on the upper wall of the upper channel to vary the pressure prevailing in the bubble within as broad a range of values as possible, without having to modify the way in which the fan supplying the lower channel with fluidization gas operated. During these tests, the applicant was surprised to note that opening the escape valve made it a possible to stabilize the upper level of powder in the column, in the sense that the amplitude of altitude variation of the upper level of the column had very substantially decreased. In other, later tests designed to simulate an air chute provided with barriers separating several bubbles, the applicant took up this idea of equipping the upper part of the upper channel with an escape valve: he was surprised to note that this also prevented the appearance of high-amplitude undulations on the surface of the potential fluidization bed in the upper channel.

In this way, by equipping with an escape valve, at the level of each bubble, the upper part of the upper channel of an air chute, the applicant realized that the pressure drop caused by this valve made it possible to stabilize the bubble pressure, the level of powder in the balancing column and, more generally, the flow of powder, in a particularly effective way. Armed with this knowledge, the applicant wondered whether the use of such an escape valve could not make it possible to decrease the number of balancing columns, or even do away with them completely, if such escape valves could completely fulfill the role that had up to that point been reserved for the balancing columns, i.e. to balance the pressure $p_f$ of the potential fluidization gas.

In some final tests, the applicant was able to confirm this intuition: it is possible to make an air chute work without balancing columns to transport, by potential fluidization, a powder in a hyperdense phase: all that is required is to replace said balancing column by an escape valve, or more broadly by any means which creates a substantially constant pressure drop whose predetermined value makes it possible, with a substantially constant fluidization pressure $p_f$ in the lower channel and with a substantially constant external pressure $p_a$, to maintain bubble pressure $p_b$ at a stable value in an optimal field of values for the flow of powder, ranging between $p_a$ and $p_f$.

In other words, the device according to the invention comprises, at the level of at least one bubble—and preferably at the level of each bubble—, a means of creating pressure drop, independently of whether it is provided with a balancing column. In the first case, said means of creating pressure drop mainly plays a stabilizing role with regard to the level of the suspension (powder+gas) which is in the balancing column and which balances the fluidization pressure. In the second case, it also performs the role which was reserved for the balancing column. In addition, in the absence of balancing column, it makes it possible, for an identical source of pressure, to reach a higher bubble pressure and to therefore increase the transportation capacity of the conveyer for the same amount of energy consumed. Obviously, the bubble pressure is higher but cannot reach the level of the fluidization pressure since the gas drops in pressure while passing through the porous wall and also drops in pressure while flowing out through the particles in the fluidized bed.

The first case (with balancing columns) corresponds to the improvement to existing industrial is systems, or to the provision of conveyers with a number of balancing columns greatly limited as compared with current practice, for example conveyers characterized by the fact that they are provided with a balancing column every 20 meters instead of a balancing column every 6 meters. The second case corresponds to the provision of new conveyers characterized by a total absence of balancing columns.

The device according to the invention has the advantage of making it possible to control the level of the bubble pressure and that of the outlet velocity of the fluidization gas. In the balancing column, it is the powder/gas suspension which acts as a pressure gauge: by its density and its volume (represented by the height of the column), it balances the pressure prevailing in the upper channel. The manometric effect of the material in the balancing column was a major asset which explains the success of this type of device but it has the disadvantage of making the bubble pressure mainly dependant on the fluidization pressure, so that the bubble pressure can be varied only by varying the fluidization pressure. By removing the balancing column and by replacing it by a means which creates a controlled pressure drop, set to a predetermined value, the bubble pressure can be modified more directly, without having to modify the fluidization pressure, so that the conditions of use of the conveyer are much more flexible.

Advantageously, in particular to avoid pollution of said external environment by the fine powder particles entrained by the fluidization gas being removed, said means of removal of the fluidization gas is also provided with at least one solid/gas separation device. Obviously, this solid/gas separation device itself creates a pressure drop which it is necessary to take into account so as to appropriately design said means of creating pressure drop.

"Means of creating pressure drop" is taken to mean:
a) a simple opening, or "diaphragm", adjacent to the envelope of the volume occupied by the bubble, made for example in the upper wall of the upper channel, whose diameter corresponds to the pressure drop which is appropriate for the required bubble pressure; said opening may be the inlet opening of an outlet pipe leading said gas to said external environment;
b) an escape valve, with an opening of variable diameter, thereby making it possible to vary the pressure drop undergone by the gas while it is being removed, and so to vary the bubble pressure;
c) a venturi meter;
d) at least one solid/gas separator, often necessary in this field, for example a device of the cyclone type, in which the gas charged with solid particles is introduced by a side jet inside said device, against a substantially cylindrical wall: the solid particles, driven out by centrifugation but stopped by said cylindrical wall, lose their kinetic energy, fall by gravity and are collected at the base of said cylindrical wall to be removed by the bottom part of said device.

In a preferred embodiment of the invention, a means of creating pressure drop is chosen, including at least one solid/gas separation device placed in the upper part of the upper channel, so that the solid particles held back by said device can be removed directly in the suspension. For this purpose, the duct for removing the solid particles held back by said device has a length defined so that its bottom end plunges into said suspension when it is in a state of potential fluidization. Usually, the top section of a standard cyclone has a cylindrical wall whose internal face is designed to receive the suspension side jet, a conical wall converging downwards, which connects the bottom end of said cylindrical wall to a cylindrical duct, whose bottom end has an opening through which the solid particles are removed. If a standard cyclone is used, this is laid out in the upper channel of the air chute so that the bottom end of the cylindrical duct plunges into the suspension in a state of potential fluidization. Within the context of this invention, it is preferred to use a standard cyclone device, simpler in the sense that it does not have a convergent conical wall: the cylindrical wall and duct are one and the same cylindrical wall whose bottom end plunges into the suspension in a state of potential fluidization.

Advantageously, to meet with increasingly demanding environmental requirements, at least two devices of the cyclone type are assembled in series on the fluidization gas removal circuit, which makes it possible to perfectly dedust said gas, in the sense that when it leaves, it contains practically no more solid particles of size greater than 3 micrometers. The device(s) of the cyclone type may be standard cyclones, which have a convergent conical wall at the base of said cylindrical duct but, preferably, special cyclones will be chosen which have a cylindrical wall the bottom part of which plunges directly into the suspension.

By means of the device according to the invention, the losses due to fly-off are substantially reduced. The turbulent mode prevailing in the balancing columns of former art is such that a great number of particles are entrained by fly off. The applicant noted that the fact of stabilizing the upper level of powder in the balancing column (if there still is one), as well as the fact of stabilizing the upper level of the potential fluidization bed in the upper channel, made it possible to almost completely remove fly-off particles, whose size is typically greater than 5 micrometers, in the usual conditions of use of the device. However, even though this has an unquestionable advantage, it does not seem possible, with only one means of creating pressure drop, to remove micrometric and nanometric fly-off fines and it often proves necessary to associate said means of creating pressure drop with additional means of solid/gas separation.

The invention also has the advantage, if the balancing columns are removed or if their number is reduced, of both simplifying the design and the manufacture of the air chutes, and of reducing energy consumption, because the fluidization pressure can be used much more effectively by imposing a bubble pressure much closer to said fluidization pressure in each bubble.

Said means of creating pressure drop includes at least one opening of predetermined section, whose size makes it possible to create the required pressure drop. If this opening is the only outlet for the fluidization gas, it is advantageous to aim at an opening diameter allowing a rate of leakage at least equal to $S.u_f$, where S is the surface of the part of the porous wall corresponding to the bubble concerned, and where $u_f$ is the fluidization velocity. Typically, for a material such as metallurgical alumina, the fluidization velocity ranges between 5 and 15 mm·s$^{-1}$. So for a part of the air chute corresponding to a given bubble, that we will hereafter refer to as the "box", the section of the porous wall is known, the gas outlet rate, which corresponds to flow $S.u_f$, can be deduced from this and the diameter of the opening can therefore be defined, since, for a given opening diameter, the conventional laws of hydraulics make it possible to find the relationship between the pressure drop and the rate of leakage.

The pressure drop through an opening is substantially proportional to the square of the mass flow of gas leakage passing through said opening and follows a law of the type:

$$\Delta P = \frac{1}{2\rho}\left[\frac{F_g(1-\beta^4)^{0,5}}{KA_t}\right]^2 \quad avec: \quad \begin{array}{l} \beta = \dfrac{d_{or}}{d_t} \\ At = \dfrac{\pi}{4}d_t^2 \end{array}$$

where:
ΔP is the pressure drop through the opening (expressed in bar; 1 bar=0.1 MPa)
$d_{or}$ is the diameter of the opening
$d_t$ is the diameter of the tube which connects the upper wall of the upper channel to the diaphragm having said opening
ρ is the density of the fluidization air (expressed in kg/m$^3$)
$F_g$ is the mass flow of fluidization air (kg/h) ("rate of leakage")
K is a pressure drop constant Let us take, as example, an air chute provided with a 14 cm wide porous wall. If, at the level of a box, one aims at a bubble pressure of 0.05 bar (5,000 Pa) (expressed here in terms of excess pressure in relation to atmospheric pressure), and a fluidization gas velocity of 15 mm/s, the diameter of the opening connecting the upper part of the upper channel with the ambient air must be 25 mm if the box is 12 m long, 34 mm if the is box 24 m long, and 46 mm if the box is 72 m long.

If, on the other hand, the portion of air chute also includes a balancing column, the diameter of the opening is chosen to be smaller, so that the level of the solid/gas suspension in the balancing column can be controlled while ensuring a low velocity of gas fluidization. Returning to the example in the previous paragraph, a current box, which is provided with a balancing column and has a typical length of approximately 6 meters, would have to be provided with an opening with a diameter of approximately 20 mm if the balancing column were removed. However, if it is desired to keep said balancing column and if it is simply desired to use this new means of creating pressure drop with the aim of stabilizing the upper level of the suspension (gas+powder) in the balancing column, an opening with a diameter significantly smaller than 20 mm is created, the height of filling said suspension in the balancing column making it possible to balance the pressure prevailing in the upper channel minus the pressure drop due to said opening.

Advantageously, the means of creating pressure drop, which ensures a substantially constant bubble pressure by creating a constant pressure drop in relation to the outside pressure, is designed so that said pressure drop is great, so as not to impose too great an altitude on the upper level of powder in the balancing column. By making sure that the height of the solid/gas suspension column in the balancing column does not exceed a certain value, typically about 1 m, the spatial requirements, the weight and the cost of said balancing columns are kept to a minimum, while improving the reliability of the conveying system.

Said opening can advantageously have a variable section, like the opening of a valve, which makes it possible to vary the bubble pressure—and therefore to make the conditions of local operating of the air chute less stringent—or to adapt a device of given geometry for the conveying of various powders. On this subject, the field of powders likely to be concerned by conveying in a hyperdense bed can be seen in WO2009/010667: shown in the Geldart diagram illustrated in FIG. 1, where they are characterized by their average particle size and their density (more accurately, the difference between the latter and the density of the fluidization gas), they are located preferably in the shaded zone of FIG. 1 in this document.

Figure 6:
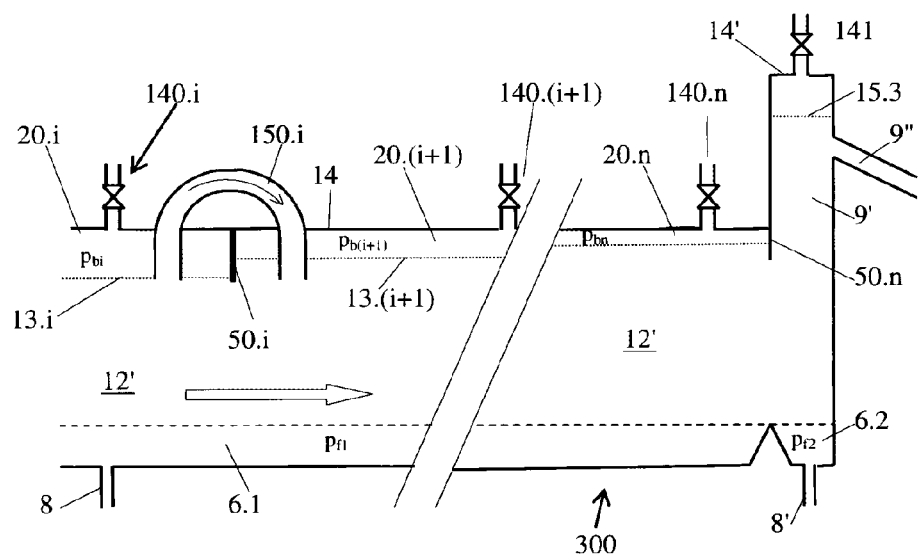

FIG. 6 is a schematic vertical cross-section of an intermediate portion and end portion of a fourth device according to the invention. The intermediate portion illustrated corresponds to the boundary between two adjacent, bubbles indexed i and i+1. Material supply, not shown, may be imagined from the previous figures, the direction of flow of material being always, by convention, from left to right.

EXAMPLES OF EMBODIMENTS

Example 1

Figure 1:
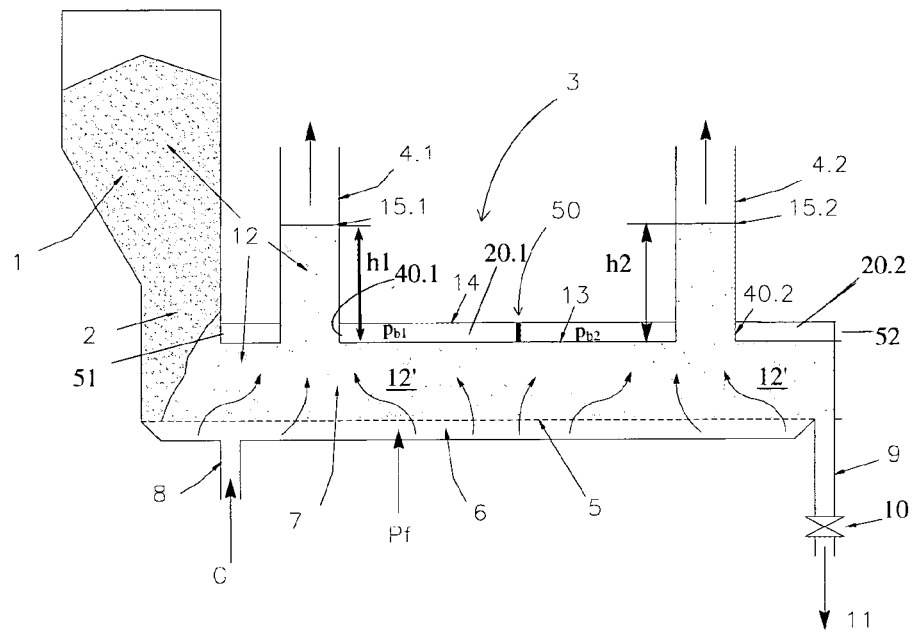
FIG. 1 is a schematic vertical cross-section of a device of prior art provided with a balancing column, as illustrated in EP 1.086.035.
Figure 2:
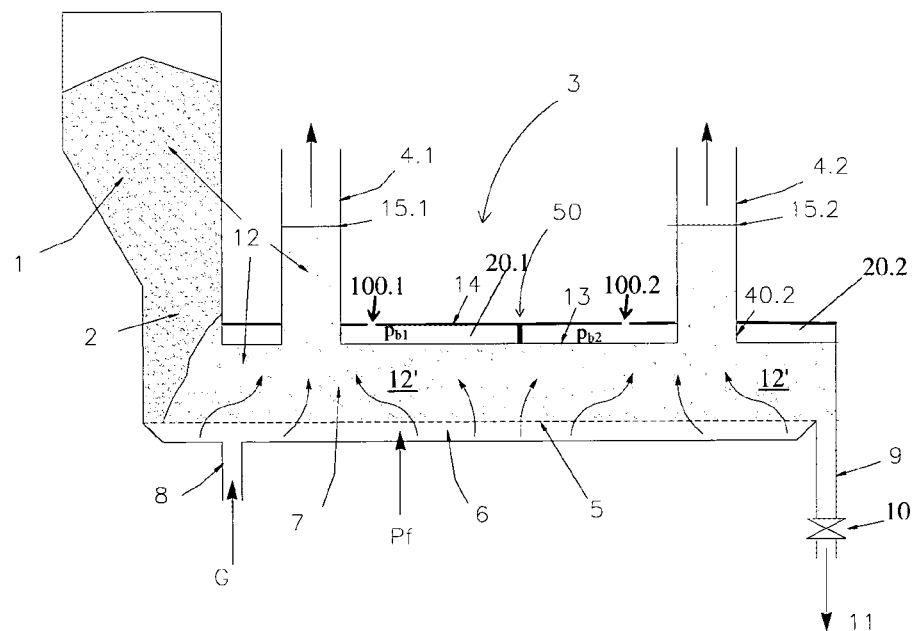
FIG. 2 illustrates a first method of the invention applied to this device.

Modification to a Device of Prior Art (FIGS. 1 and 2)

The device illustrated in FIG. 1 was described in EP 1.086.035. It is composed of an overhead storage tank 1 for the material to be transported, connected by a chute 2 to a conveyor 3 of the air chute type, and a means of removal 9 from the conveyor, which, using a controlled proportioning system 10, entrains powder towards the zone to be supplied 11.

The overhead storage tank 1 contains the bulk powder material 12, at atmospheric pressure. This tank is under load on one of the ends of the horizontal conveyor 3 via chute 2. Conveyor 3 is composed of a porous wall 5 separating a lower channel 6 and an upper channel 7 designed for the circulation of powder.

A fluidization gas G is introduced through a chute 8 into the lower channel 6, where it is subjected to fluidization pressure $p_r$. This gas passes through the porous wall 5 then through the powder 12 which fills the upper channel 7 of the conveyer, forming with the latter a potential fluidization bed 12', i.e. a suspension of solid particles of powder in a gas phase. This potential fluidization bed 12' is in a hyperdense phase, the suspension having, in the case of alumina to be used for electrolysis tanks, a density of about 900 kg per m$^3$. The gas is removed with a low flow rate as it passes through the powder which partially fills the balancing column (4.1, 4.2) up to a substantially horizontal upper level (15.1, 15.2), the total head (h1, h2) balancing the gas pressure $p_f$ at the level of each bubble (20.1, 20.2). Above the upper level 13 of the potential fluidization bed 12' a gas bubble under pressure (20.1, 20.2) is formed, so confined within a space formed by the upper wall 14 of the upper channel 7 and the barriers. For bubble 20.1, these barriers are formed by flat iron 50, penetration 51 of the storage tank and penetration 40.1 of the balancing column 4.1. For bubble 20.2, these barriers are formed by the flat iron 50, penetration 40.2 of the balancing column 4.2 and the upper part of the end side wall 52 of the air chute. Within bubbles 20.1 and 20.2 bubble pressures $p_{b1}$ and $p_{b2}$ prevail respectively, as a result of putting lower channel 6 under fluidization pressure $p_f$. With the device according to prior art, these bubble pressures can be modified only by varying fluidization pressure $p_f$.

As shown in FIG. 2, the previous device has been modified, in the sense that, in accordance with the present invention, an opening (100.1, 100.2) in the upper wall 14 of upper channel 7 was made at the level of each bubble (20.1, 20.2), in order to allow fluidization gas to escape to an external environment in which a substantially constant pressure prevails, the fluidization gas moving through this opening with a well-defined pressure drop, which depends on the diameter of said opening. The first effect of this opening is to stabilize the position of the upper levels 15.1 and 15.2, i.e. heights h1 and h2 of the volumes of powder occupying balancing columns 4.1 and 4.2, so that losses by fly-off are substantially reduced without needing to give a particular shape to the upper ends of said balancing columns. As an indication, on the experimental device, which is certainly slightly different from the device illustrated in FIG. 2 in the sense that it had only one bubble with which an escape valve was associated, the amplitudes of the variation in altitude of the upper level of the powder column decreased from several hundreds of millimeters to a few millimeters. In the experimental device, the upper channel was 40 cm high. Its upper part was provided with a barrier making it possible to create a bubble at high pressure of a few centimeters. The fan used made it possible to vary the fluidization pressure between 90 and 200 mbar (relative pressure: this is excess pressure in relation to atmospheric pressure). Depending on the opening of the escape valve, the bubble pressure varied between 15 and 100 mbar, and the height of the column of solid/gas suspension in the balancing column varied between 20 and 100 cm, this height remaining practically stable when valve opening was blocked at a given diameter and the fan kept at a given velocity.

The fact of stabilizing the upper level of the balancing column makes it possible to almost completely remove fly-off particles, whose size is typically greater than 5 micrometers, in the usual conditions of use of the device.

In a variant of the modification according to the invention of a device provided with balancing columns, the openings made in the upper wall of the upper channel are of variable diameter (the upper zone of each bubble can, for example, be provided with an escape valve). In this way, the bubble pressure in each bubble can be modified separately, by acting directly on the escape valve associated with the bubble concerned, without having to modify the fluidization pressure.

Example 2

Figure 3:
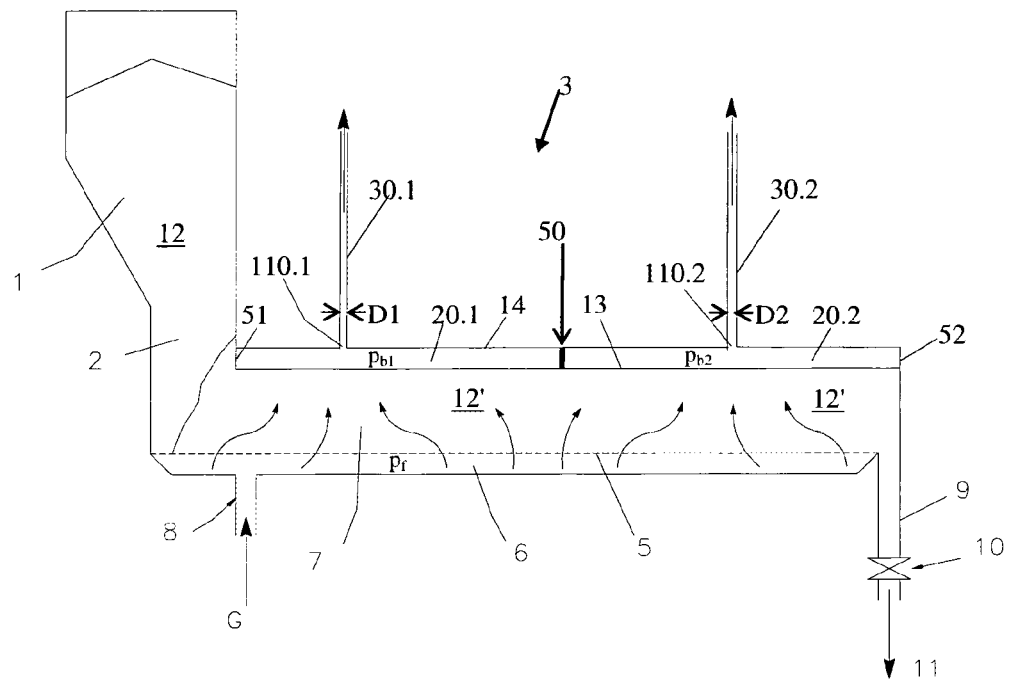
FIG. 3 is a schematic vertical cross-section of a device according to a method of the invention, not provided with a balancing column.
Figure 4:
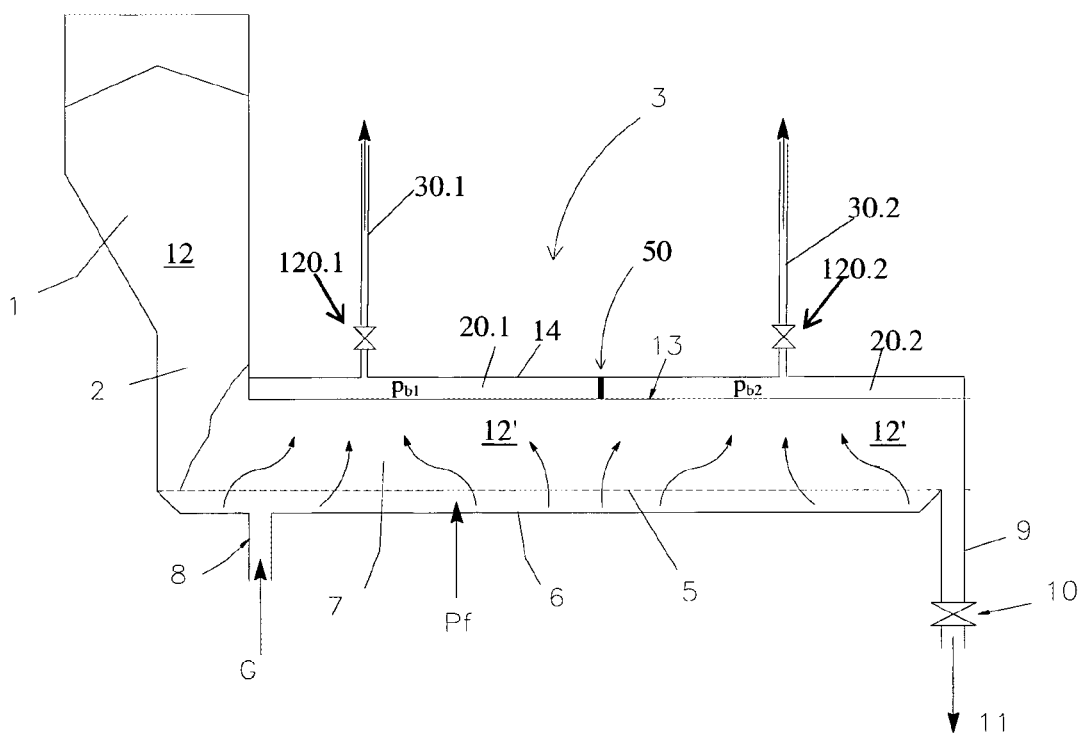
FIG. 4 is a schematic vertical cross-section, of a device similar to the previous one, differing from it in that, at the level of each bubble, the upper wall of the upper channel is provided with an escape valve.

FIGS. 3 and 4

Example 2 illustrates a device according to the invention characterized in that it has no balancing columns. Bubble pressures $p_{b1}$ and $p_{b2}$ are maintained substantially constant at predetermined values, by means of the pressure drops created by openings 110.1 and 110.2, of respective diameters D1 and D2, made in the upper wall 14 of upper channel 7. Openings 110.1 and 110.2 are the inlets of pipes 30.1 and 30.2 of diameters at least equal to D1 and D2 respectively, which allow fluidization gas to be removed. Said outlet pipes emerge into the atmosphere or, preferably, in particular when a device for continuously supplying alumina for electrolysis cells is involved, lead to gas processing centers.

By means of this device, losses due to fly-off are substantially decreased. To purify the gas of even finer, typically submicronic, or even nanometric particles, outlet pipes 30.1 and 30.2 for the fluidization gas are advantageously provided with a de-dusting device, for example a is cyclone (not shown in FIG. 3). In this case, the inlet opening of pipe 30.1 (30.2 respectively) must have a predetermined section different from that which it would have if there were no de-dusting device, because the sum of the pressure drops must be equivalent to the pressure drop provided by the opening alone.

FIG. 4 illustrates a variant of the previous device without balancing columns, in which the openings have been replaced by escape valves 120.1 and 120.2 connecting the upper zone of each bubble 20.1 and 20.2 to a fluidization gas outlet pipe (30.1 and 30.2). Opening of the valve is variable, so that by varying the opening diameter the bubble pressure can be varied at the level of each bubble. A first advantage of such a device is to be able to control and take action locally on the flow of material in the conveyer. Another advantage is to have a device of given geometry able to be used to convey different materials.

Example 3

FIG. 5

Figure 5:
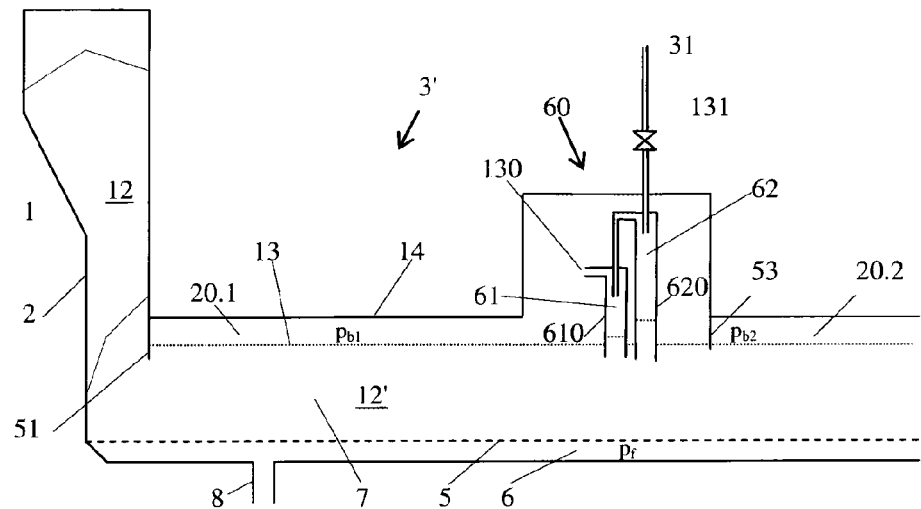
FIG. 5 is a schematic vertical cross-section, of a portion of another device according to the invention, suitable for both the continuous supply of powder from a storage unit and for the conveying of powder over a long distance.

FIG. 5 illustrates another embodiment according to the invention, more particularly a designed for conveying powder over a long distance, in conditions where the fluidization gas cannot be sent to a gas processing center. The means of removing fluidization gas here includes a chamber 60 which is made in the upper zone of upper channel 7, inside which at least one solid/gas separation device is to be found. In the embodiment illustrating this example, two gas/solid separation devices 61 and 62, here of cyclone type, are assembled in series in order to meet with increasingly demanding environmental requirements: the dust-free gas now contains only a negligible proportion of micrometric fines. Each of these devices includes a substantially cylindrical wall 610 and 620 the bottom part of which plunges into the potential fluidization bed, and an inlet pipe, designed so that the gas/solid suspension arrives tangentially towards said cylindrical wall. The tangential entry causes a solid/gas flow along the wall and towards the bottom of the cyclone. The centrifugal force so generated separates the particles from the gas. The solid particles come into contact with the cylindrical wall, lose part of their kinetic energy and are drawn by gravity towards the potential fluidization bed. The height of this cylindrical wall is defined so that the solid coming directly from the potential fluidization bed does not block said cyclone.

The inlet pipe of the first cyclone has an inlet opening 130, whose diameter is calculated so that the entry velocity of the flow to be de-dusted ranges between 2 and 40 m/s, preferably between 15 and 40 m/s, in order to have the most efficient possible separation. Each cyclone must be designed so that the inlet diameter, adapted to make said cyclone operate properly, contributes to the total pressure drop aimed at to reach the predetermined value, defined within the framework of this invention. Outlet pipe 31 of said cyclone device, used to remove the fluidization gas, is provided with an escape valve 131 whose variable opening makes it possible to control bubble pressure $p_{b1}$.

Example 4

FIG. 6

The device of this example, illustrated in FIG. 6, is, like the device in the previous example, designed for conveying powder over long distances. It has two independent advantageous characteristics.

The first of these characteristics relates to the configuration of the end box 300: instead of having, as in the first examples, a means of removal 9, connected to the bottom of the upper channel, substantially vertical and directed downwards, it is provided with a substantially vertical end column 9', directed upwards, in which the material can rise as a result of the pressure of the fluidization gas. A by-pass 9" allows the powder to be dumped out. By-pass 9" is connected to said end column 9', at an altitude slightly higher than that of the upper wall 14 of upper channel 7 and chosen so that the junction can be under the upper level 15.3 of the powder+gas suspension. Advantageously, said end column 9' is topped by an upper wall 14' provided with a means of creating pressure drop, such as an escape valve 141, so that a bubble under pressure can be established below said upper wall, at a given bubble pressure. Such a configuration makes it possible to stabilize, at this place, the upper level of the potential fluidization bed 12', which helps to achieve continuous flow at a constant rate of the material to be conveyed. Advantageously, in this extreme part, a zone 6.2 of the lower channel is separately supplied with fluidization gas in order to have a different fluidization pressure $p_{f2}$ typically greater, than pressure $p_{f1}$ which prevails in the rest, i.e. almost all 6.1 of the lower channel.

Such a configuration, having a by-pass 9" dump above the upper level 15.3 of the powder+gas suspension, is particularly well suited to a flow performed without risk of segregation, using a bubbling mode such as that recommended in request WO2009/010667. For materials presenting a risk of segregation, such as polydisperse powders, it is preferable to make provision at the level of this end box, for an outlet slightly above the porous wall (or fabric) 5.

The second of these characteristics is of particular interest because it makes it possible to convey powder over a long distance, while making it gradually gain altitude. The air chute has a compartmentalized upper channel so that it has n adjacent bubbles at respective pressures $p_{bi}$, i varying from 1 to n. The upper wall 14 of the upper channel is provided with obstacles, transverse walls such as 50.i and 50.n. Each related bubble 20.i (i=1 to N) is provided with a means of creating pressure drop, here an escape valve 140.i. Adjacent bubbles 20.i and 20.(i+1) are separated by a barrier 50.i. An upside-down U-shaped pipe 150.i, which we will 21i thereafter refer to as a "siphon" is placed on the chute so that the branches of the U are on either side of said barrier 50.i, and are of sufficient length for their ends to emerge into the potential fluidization suspension. Escape valves 140.i and 140.(i+1) are set so that, on both sides of barrier 50.i, there prevails a bubble pressure $p_{bi}$ greater than $p_{b(i+1)}$. In practice, the upstream escape valve 140.i is less open than the downstream escape valve 140.(i+1). Because of this, the fluidization gas being able to escape at a lower leakage rate in the upstream portion than in the downstream portion, bubble pressure $p_{b(i+1)}$ is lower than bubble pressure $p_{bi}$ and a gas current is set up in the siphon (illustrated by a single arrow in FIG. 6) which moves from the upstream portion to the downstream portion to be removed via the downstream escape valve 140.(i+1). Surprisingly, the applicant noted that this gas current in said siphon occurred without entraining any solid particles.

As a result of this difference in bubble pressure, the upper level 13.i of the potential fluidization bed upstream of barrier 50.i is at an altitude lower than the upper level 13.(i+1) of the potential fluidization bed downstream of barrier 50.i. It can be seen that in this way the upper level of the potential fluidization bed has its altitude raised each time it passes barrier 50.i.

Obviously, the upside-down U-shaped pipe cannot have just any section: the passage of fluidization gas from one bubble to another, which occurs with a mass flow corresponding to the difference between the rate of leakages of the means of removal of these adjacent bubbles, must take place at a velocity close to or lower than the speed of transportation of alumina, in order to limit particle fly-off. In fact, what counts in order to obtain the desired effect (to convey powder over a long distance, while making it gradually gain altitude) is:
   a) providing two adjacent bubbles with means of creating pressure drop so that the pressure drop at the outlet of the bubble downstream is greater than the pressure drop at the outlet of the bubble upstream and
   b) making a passage between the two adjacent bubbles so as to compensate for the difference in the leakage rate of the means of removal of said adjacent bubbles, said passage—typically an upside-down U-shaped pipe placed on the chute so that the branches of the U are on either side of said barrier 50.i, and are of sufficient length for their ends to emerge in the potential fluidization suspension—having a section such that the fluidization gas goes through this passage at a velocity close to or lower than the speed of transportation of alumina.

The invention claimed is:

1. Device for transporting a powder, between a supply zone and at least one zone to be supplied, including a conveyer, which includes a lower channel, designed for the circulation of a gas, and an upper channel, designed for the circulation of powder and said gas, said lower channel and said upper channel being separated by a porous wall that can be crossed by said gas, the lower channel being connected to a gas supply pipe able to supply said lower channel with gas at a fluidization pressure such that it allows the potential fluidization of said powder in said upper channel, said upper channel being provided in its upper part with transverse walls forming an obstacle to the circulation of said gas and said powder, said transverse walls being laid out to form with an upper wall of said channel at least one space, in which a gas bubble under pressure is formed, at a given bubble pressure, resulting from putting said conveyer under potential fluidization pressure, said conveyer consisting of boxes each of which corresponds to a given bubble, said device being characterized in that, at the level of at least one bubble, the wall of the upper channel is provided with a means of removal of the fluidization gas connecting said bubble to an external environment and including a means of creating pressure drop which creates a substantially constant pressure drop.

2. Device according to claim 1, characterized in that the means of creating pressure drop is designed so that said substantially constant pressure drop created by said means is defined at a value such that, if the pressure in said external environment is substantially constant, said bubble pressure is itself kept at a substantially constant value, ranging between the fluidization pressure and the pressure of said external environment.

3. Device according to claim 1 characterized in that at the level of each bubble, the wall of the upper channel is provided with the means of removal of fluidization gas connecting said upper channel to said external environment and including the means of creating pressure drop which creates the substantially constant pressure drop.

4. Device according to claim 1, characterized in that the device has no balancing column with a higher end open to an external environment and which is filled with powder so that, when putting said conveyer under potential fluidization pressure, the suspension comprising the gas and the powder which fills said balancing column has a filling height which makes it possible to balance the pressure prevailing in said upper channel.

5. Device according to claim 1, characterized in that said means of removal includes at least one solid/gas separator.

6. Device according to claim 1, characterized in that said means of removal is said means of creating pressure drop and takes the form of an opening adjacent to the envelope of the volume occupied by said bubble, the opening having a diameter that corresponds to the pressure drop which is appropriate for the desired bubble pressure.

7. Device according to claim 1, characterized in that said means of removal of the fluidization gas is a pipe emerging into the upper channel at the level of the bubble, said means of creating pressure drop being an inlet opening of said pipe, the inlet opening having a diameter that corresponds to the pressure drop which is appropriate for the desired bubble pressure.

8. Device according to claim 7, characterized in that said pipe is provided with an escape valve, having an opening of variable diameter, making it possible to vary the pressure drop undergone by the gas while the gas is being removed.

9. Device according to claim 5, characterized in that said means of removal of the fluidization gas includes a chamber which is created in the upper part of upper channel and inside which said solid/gas separation device is to be found.

10. Device according to claim 9, in which said solid/gas separation device is of the cyclone type and includes a duct for removal of solid particles held back by said device, whose length is defined so that a bottom end of the duct plunges into said suspension when said suspension is in a state of potential fluidization.

11. Device according to claim 9, in which said solid/gas separation device includes an inlet pipe and a substantially cylindrical wall, the inlet pipe being made so that a gas charged with solid particles arrives tangentially onto said substantially cylindrical wall, said substantially cylindrical wall having a height defined so that a bottom part of said substantially cylindrical wall plunges into the suspension in the upper channel when the suspension is in a state of potential fluidization.

12. Device according to claim 9, in which said solid/gas separation device has an inlet opening for a gas charged with solid particles, whose diameter is calculated so that the intake velocity of said gas to be de-dusted ranges between 2 and 40 m/s, said device being designed so that the diameter of the inlet opening, adapted to make said separating device operate properly, contributes to the total pressure drop aimed at to reach the required bubble pressure.

13. Device according to claim 12, in which an outlet pipe of said solid/gas separation device is provided with an escape valve whose variable opening makes it possible to control the bubble pressure.

14. Device according to claim 9, in which said solid/gas separation device is composed of several devices of the cyclone type assembled in series.

15. Device according to claim 1, characterized in that the device includes an end box, provided with a substantially vertical end column, directed upwards, in which the powder can rise as a result of the fluidization gas pressure, a by-pass allowing the powder to be dumped out, said by-pass being connected to said end column, at an altitude slightly higher than that of the upper wall of the upper channel and chosen so that the junction can be under the upper level of the suspension comprising powder and gas.

16. Device according to claim 15, in which said end column is surmounted by an upper wall provided with a means of creating pressure drop, so that the bubble under pressure can be established below said upper wall, at the given bubble pressure.

17. Device according to claim 15, in which, at the level of said end box, a zone of the lower channel is separately supplied with fluidization gas to get a second fluidization pressure different from the fluidization pressure prevailing in the rest of the lower channel.

18. Device according to claim 15 in which the bottom of the upper channel of the end box is also provided with a means of removal, located slightly above the porous wall.

19. Device according to claim 1, characterized in that said upper channel is compartmentalized so that it has n adjacent bubbles at respective pressures $P_{b_i}$, i varying from 1 to n, the upper wall of the upper channel being provided with barriers separating said bubbles, each related bubble being provided with a means of creating pressure drop, and in that at least two compartments of the upper channel corresponding to two adjacent bubbles are provided with means of creating pressure drop so that the pressure drop at the outlet of the downstream bubble is greater than the pressure drop at the outlet of the upstream bubble and in that a passage is made between said adjacent bubbles, which makes it possible to compensate for the difference between the leakage rate of the means of removal of said adjacent bubbles, said passage having a section such that fluidization gas passes through the passage at a velocity close to or lower than the fluidization velocity.

20. Device according to claim 19 in which said passage is an upside-down U-shaped pipe placed on the conveyer, the U-shaped pipe having branches on either side of said barrier separating said adjacent bubbles, said branches being of sufficient length for ends of said branches to emerge in the potential fluidization suspension.

21. Device for transporting a powder, between a supply zone and at least one zone to be supplied, comprising:
 a conveyer, which includes a lower channel, designed for the circulation of a gas, and an upper channel, designed for the circulation of powder and said gas, said lower channel and said upper channel being separated by a porous wall that can be crossed by said gas, the lower channel being connected to a gas supply pipe able to supply said lower channel with gas at a fluidization pressure, allowing the potential fluidization of said powder in said upper channel;
 transverse walls provided in an upper part of said upper channel, the transverse walls forming an obstacle to the circulation of said gas and said powder, said transverse walls being laid out to form with an upper wall of said channel at least one space, in which a gas bubble under pressure is formed, at a given bubble pressure, resulting from putting said conveyer under potential fluidization pressure, said conveyer consisting of boxes each of which corresponds to a given bubble; and
 a means of removal of the fluidization gas provided in the wall of the upper channel at the level of at least one bubble and in communication with the at least one bubble, the means of removal of the fluidization gas connecting said at least one bubble to an external environment and including a means of creating pressure drop which is adapted to create a substantially constant pressure drop in the at least one bubble.

* * * * *